United States Patent [19]
Lima

[11] Patent Number: 5,895,593
[45] Date of Patent: Apr. 20, 1999

[54] PLASTIC FISHING BAIT COUPLING TOOL

[76] Inventor: Matthew Lima, Rte 3 Box 259, Comanche, Okla. 73529

[21] Appl. No.: 09/156,116

[22] Filed: Sep. 17, 1998

[51] Int. Cl.$^6$ .............................. H05B 1/00; B32B 35/00
[52] U.S. Cl. .............. 219/228; 219/229; 264/36.15; 156/503
[58] Field of Search .................. 219/228, 221, 219/222, 223, 242, 521, 201, 200, 535, 229; 156/499, 579, 318, 458, 460, 503; 425/12; 264/36.15

[56] References Cited

U.S. PATENT DOCUMENTS

| | | | |
|---|---|---|---|
| D. 120,116 | 4/1940 | Young | D8/30 |
| 2,166,585 | 7/1939 | Evans | 43/1 |
| 3,900,714 | 8/1975 | Beyer | 219/229 |
| 3,968,951 | 7/1976 | Zeman | 249/55 |
| 4,149,335 | 4/1979 | Duescher | 43/42.53 |
| 4,358,661 | 11/1982 | Kaderabek | 219/230 |
| 4,464,857 | 8/1984 | Olszewski | 43/42.33 |
| 4,484,975 | 11/1984 | McElroy | 156/503 |
| 4,771,161 | 9/1988 | Levy et al. | 219/228 |
| 4,808,792 | 2/1989 | Austrian | 392/403 |
| 4,867,933 | 9/1989 | Schmidt | 264/36.15 |
| 5,478,118 | 12/1995 | Barq et al. | 285/21.2 |
| 5,484,506 | 1/1996 | DuPont et al. | 156/503 |

*Primary Examiner*—John A. Jeffery
*Assistant Examiner*—Vinod D Patel

[57] ABSTRACT

A plastic fishing bait coupling tool for fusing plastic fishing baits together to form a unique fishing bait. The tool includes a base with a heating rod outwardly extending from a perimeter side wall of the base. The heating rod has an elongate inner portion extending into the base and an elongate outer portion outside of the base. A coiled heating element for providing heat is provided in the base and disposed around the inner portion of the heating rod. The heating rod has an outer end adjacent the outer portion of the heating rod. A heating head is coupled to the outer end of the heating rod. The heating head is generally triangular in configuration and has a bottom side and a pair of upper sides converging together at an upper vertex.

13 Claims, 2 Drawing Sheets

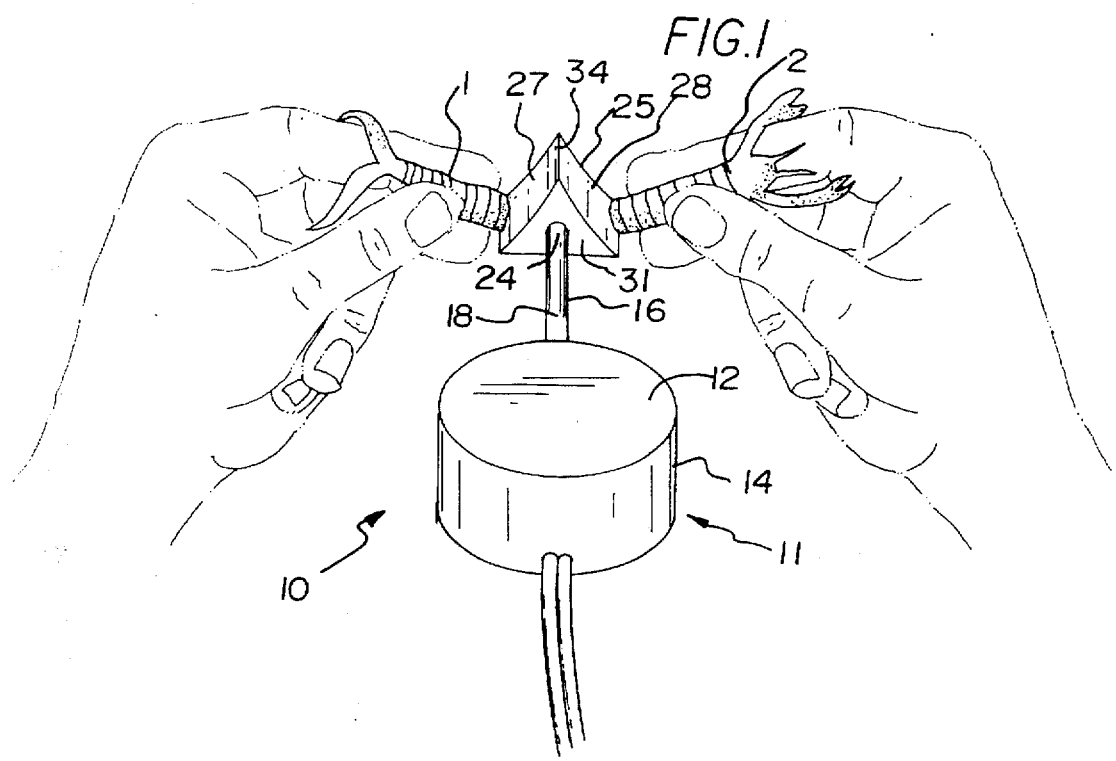
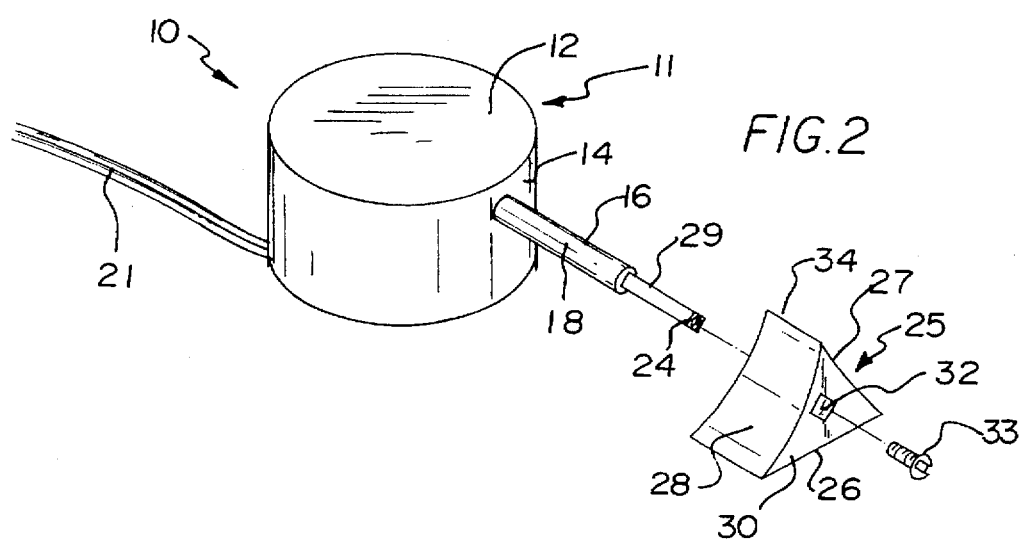

PLASTIC FISHING BAIT COUPLING TOOL

BACKGROUND OF THE INVENTION

1. Field of the Invention

The present invention relates to tools for coupling and repairing fishing baits and more particularly pertains to a new plastic fishing bait coupling tool for fusing plastic fishing baits together to form a unique fishing bait.

2. Description of the Prior Art

The use of tools for coupling and repairing fishing baits is known in the prior art. More specifically, tools for coupling and repairing fishing baits heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,867,933; U.S. Pat. No. 4,464,857; U.S. Pat. No. Des. 120,116; U.S. Pat. No. 3,968,951; U.S. Pat. No. 2,166,585; and U.S. Pat. No. 2,038,127.

While these devices fulfill their respective, particular objectives and requirements, the aforementioned patents do not disclose a new plastic fishing bait coupling tool. The inventive device includes a base with a heating rod outwardly extending from a perimeter side wall of the base. The heating rod has an elongate inner portion extending into the base and an elongate outer portion outside of the base. A coiled heating element for providing heat is provided in the base and disposed around the inner portion of the heating rod. The heating rod has an outer end adjacent the outer portion of the heating rod. A heating head is coupled to the outer end of the heating rod. The heating head is generally triangular in configuration and has a bottom side and a pair of upper sides converging together at an upper vertex.

In these respects, the plastic fishing bait coupling tool according to the present invention substantially departs from the conventional concepts and designs of the prior art, and in so doing provides an apparatus primarily developed for the purpose of fusing plastic fishing baits together to form a unique fishing bait.

SUMMARY OF THE INVENTION

In view of the foregoing disadvantages inherent in the known types of tools for coupling and repairing fishing baits now present in the prior art, the present invention provides a new plastic fishing bait coupling tool construction wherein the same can be utilized for fusing plastic fishing baits together to form a unique fishing bait.

The general purpose of the present invention, which will be described subsequently in greater detail, is to provide a new plastic fishing bait coupling tool apparatus and method which has many of the advantages of the tools for coupling and repairing fishing baits mentioned heretofore and many novel features that result in a new plastic fishing bait coupling tool which is not anticipated, rendered obvious, suggested, or even implied by any of the prior art tools for coupling and repairing fishing baits, either alone or in any combination thereof.

To attain this, the present invention generally comprises a base with a heating rod outwardly extending from a perimeter side wall of the base. The heating rod has an elongate inner portion extending into the base and an elongate outer portion outside of the base. A coiled heating element for providing heat is provided in the base and disposed around the inner portion of the heating rod. The heating rod has an outer end adjacent the outer portion of the heating rod. A heating head is coupled to the outer end of the heating rod. The heating head is generally triangular in configuration and has a bottom side and a pair of upper sides converging together at an upper vertex.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plastic fishing bait coupling tool apparatus and method which has many of the advantages of the tools for coupling and repairing fishing baits mentioned heretofore and many novel features that result in a new plastic fishing bait coupling tool which is not anticipated, rendered obvious, suggested, or even implied by any of the prior art tools for coupling and repairing fishing baits, either alone or in any combination thereof.

It is another object of the present invention to provide a new plastic fishing bait coupling tool which may be easily and efficiently manufactured and marketed.

It is a further object of the present invention to provide a new plastic fishing bait coupling tool which is of a durable and reliable construction.

An even further object of the present invention is to provide a new plastic fishing bait coupling tool which is susceptible of a low cost of manufacture with regard to both materials and labor, and which accordingly is then susceptible of low prices of sale to the consuming public, thereby making such plastic fishing bait coupling tool economically available to the buying public.

Still yet another object of the present invention is to provide a new plastic fishing bait coupling tool which provides in the apparatuses and methods of the prior art some of the advantages thereof, while simultaneously overcoming some of the disadvantages normally associated therewith.

Still another object of the present invention is to provide a new plastic fishing bait coupling tool for fusing plastic fishing baits together to form a unique fishing bait.

Yet another object of the present invention is to provide a new plastic fishing bait coupling tool which includes a base with a heating rod outwardly extending from a perimeter side wall of the base. The heating rod has an elongate inner portion extending into the base and an elongate outer portion outside of the base. A coiled heating element for providing heat is provided in the base and disposed around the inner portion of the heating rod. The heating rod has an outer end adjacent the outer portion of the heating rod. A heating head is coupled to the outer end of the heating rod. The heating head is generally triangular in configuration and has a bottom side and a pair of upper sides converging together at an upper vertex.

Still yet another object of the present invention is to provide a new plastic fishing bait coupling tool that lets a user combine plastic fishing baits of different shapes and colors so that the user can create unique custom fishing baits with customized shapes and color patterns.

Even still another object of the present invention is to provide a new plastic fishing bait coupling tool that may also be used to repair broken plastic fishing baits.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new plastic fishing bait coupling tool in use melting portions of a pair of plastic fishing baits to fuse the fishing baits together according to the present invention.

FIG. 2 is a schematic perspective view of the present invention.

DESCRIPTION OF THE PREFERRED EMBODIMENT

Figure 3:
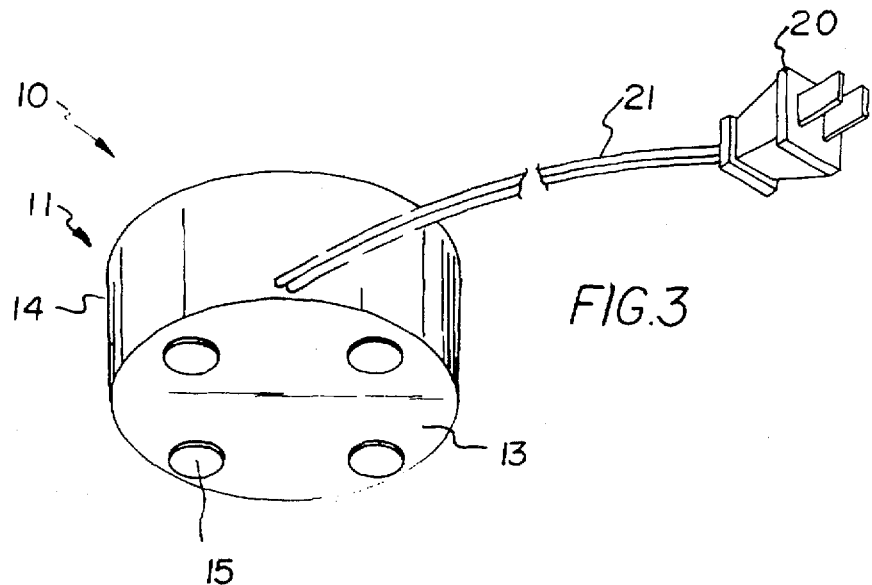
FIG. 3 is a schematic perspective view of the bottom face of the base of the present invention.
Figure 4:
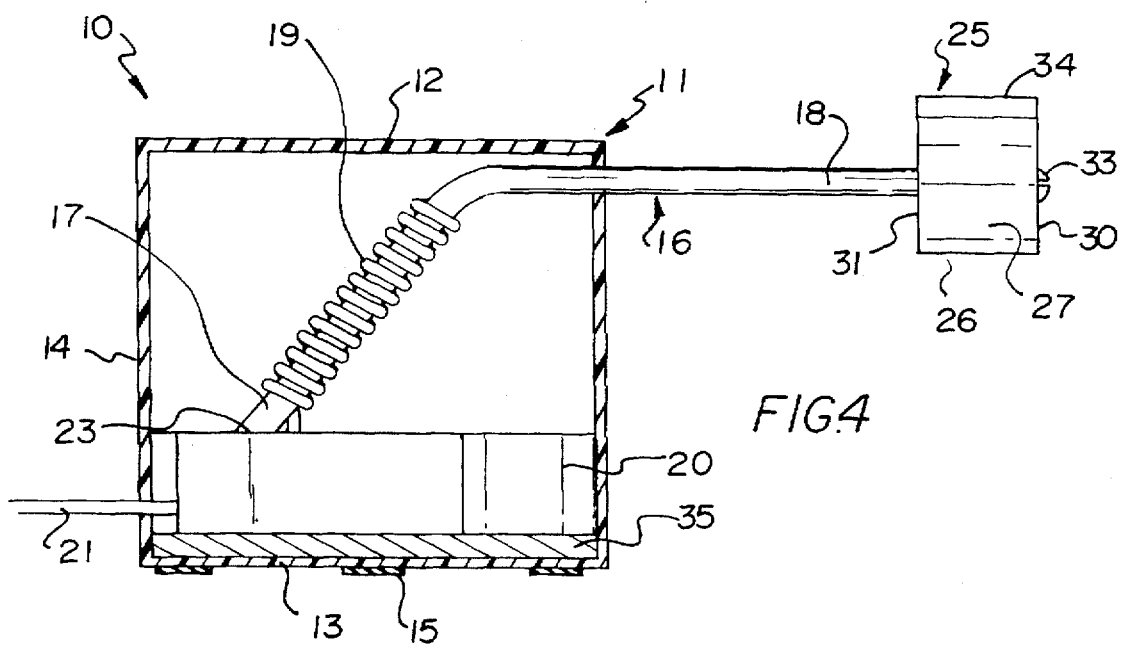
FIG. 4 is a schematic cross sectional view of the base of the present invention.

With reference now to the drawings, and in particular to FIGS. 1 through 4 thereof, a new plastic fishing bait coupling tool embodying the principles and concepts of the present invention and generally designated by the reference numeral 10 will be described.

As best illustrated in FIGS. 1 through 4, the plastic fishing bait coupling tool 10 generally comprises a base 11 with a heating rod 16 outwardly extending from a perimeter side wall 14 of the base 11. The heating rod 16 has an elongate inner portion 17 extending into the base 11 and an elongate outer portion 18 outside of the base 11. A coiled heating element 19 for providing heat is provided in the base 11 and disposed around the inner portion 17 of the heating rod 16. The heating rod 16 has an outer end 24 adjacent the outer portion 18 of the heating rod 16. A heating head 25 is coupled to the outer end 24 of the heating rod 16. The heating head 25 is generally triangular in configuration and has a bottom side 26 and a pair of upper sides 27,28 converging together at an upper vertex 34.

In closer detail, the base 11 is generally disk-shaped and has generally circular top and bottom faces 12,13, and a generally cylindrical perimeter side wall 14 between the top and bottom faces 12,13 of the base 11. The base 11 has a center axis extending between the top and bottom faces 12,13 of the base 11. Preferably, the base 11 comprises a heat insulating material so that it does not get too hot from the heating of the heating element 19. The top and bottom faces 12,13 of the base 11 are generally planar and generally lying in parallel planes to another generally perpendicular to the center axis of the base 11.

The bottom face 13 of the base 11 is designed for resting on a resting surface. The bottom face 13 of the base 11 preferably has a plurality of resiliently compressible resting pads 15 for providing a frictionally enhanced surface designed for resting of the resting surface to prevent the bottom face 13 of the base 11 from sliding on the resting surface. Ideally, the resting pads 15 are generally evenly spaced around the circumference of the bottom face 13 of the base 11.

The base 11 has a diameter defined across the perimeter side wall 14 of the base 11 and a height defined between the top and bottom faces 12,13 of the base 11. The diameter of the base 11 is greater than the height of the base 11. Preferably, the diameter of the base 11 is at least two times greater than the height of the base 11 for providing an optimal diameter to height ratio for stability when the base 11 is rested on a resting surface. Ideally, the diameter of the base 11 is about 5 inches and the height of the base 11 is about 2 inches for providing an optimal size for stability when the base 11 is rested on a resting surface.

Optionally, the base 11 has a disk-shaped metal weight 35 provided therein for providing additional weight to the base 11 for aiding stability of the base 11 on the resting surface.

The heating rod 16 outwardly extends from the perimeter side wall 14 of the base 11. The heating rod 16 comprises a heat conductive material such as a heat conductive metal material. The heating rod 16 has an elongate inner portion 17 extending into the base 11 and an elongate outer portion 18 outside of the base 11. The inner and outer portions 17,18 of the heating rod 16 each have a longitudinal axis. The inner and outer portions 17,18 of the heating rod 16 each preferably have a generally circular transverse cross section generally perpendicular to the longitudinal axis of the respective portion of the heating rod 16. The longitudinal axes of the inner and outer portions 17,18 of the heating rod 16 are extended at an acute angle with respect to each other. Preferably, the acute angle is between about 30 degrees and about 60 degrees. Ideally, the acute angle is about 50 degrees. The longitudinal axis of the outer portion 18 of the heating rod 16 extends radially outwards from the perimeter side wall 14 of the base 11. Ideally, the longitudinal axis of the outer portion 18 of the heating rod 16 generally lies in a plane generally perpendicular to the center axis of the base 11 so that the outer portion 18 of the heating rod 16 extends generally horizontal when the bottom face 13 of the base 11 is rested on a vertical resting surface.

The coiled heating element 19 for providing heat is provided in the base 11 and disposed around the inner portion 17 of the heating rod 16 such that heat from the heating element 19 is conducted to the heating rod 16 such that the heating rod 16 is heated by the heating element 19. A transformer 20 is provided in the base 11 on the weight 35. The heating element 19 is electrically connected to the transformer 20. The transformer 20 has a flexible power cord 21 outwardly extending from the perimeter side wall 14 of the base 11 preferably at a diametric location on the perimeter side wall 14 from the outer portion 18 of the heating rod 16. The power cord 21 has a plug 22 is designed for electrically connecting the transformer 20 to an electrical power source.

The heating rod 16 has an inner end 23 adjacent the inner portion 17 of the heating rod 16 coupled to the transformer 20 for holding the heating rod 16 in place. The heating rod 16 has an outer end 24 adjacent the outer portion 18 of the heating rod 16. The outer portion 18 of the heating rod 16 has a length defined between the outer end 24 and the perimeter side wall 14. Preferably, the length of the outer portion 18 of the heating rod 16 is about equal to the height of the base 11. Ideally, the length of the outer portion 18 of the heating rod 16 is about 2 inches for optimal extension of outer end 24 of the heating rod 16 away from the base 11. The outer portion 18 of the heating rod 16 also ideally has a diameter of about ⅓ inch.

The heating head 25 is coupled to the outer end 24 of the heating rod 16. The heating head 25 is generally triangular in configuration and has a bottom side 26 and a pair of arcuate upper sides 27,28 converging together at an upper vertex 34. The heating head 25 comprises a heat conductive material such as a heat conductive metal material to permit conduction of heat from the heating rod 16 to the heating head 25.

Preferably, the outer portion 18 of the heating rod 16 has an end region 29 adjacent the outer end 24 of the heating rod 16. The heating head 25 has generally triangular front and back faces 30,31 and a bore 32 extending therethrough between the front and back faces 30,31 of the heating head 25. The end region 29 of the outer portion 18 is inserted into the bore 32 of the heating head 25 from the back face of the heating head 25. The end region 29 of the outer portion 18 has a generally rectangular transverse cross section generally perpendicular to the longitudinal axis of the outer portion 18. Similarly, the bore 32 of the heating head 25 has a generally rectangular transverse cross section. The rectangular transverse cross sections of the end region 29 and the bore 32 hold the heating head 25 against rotation about the outer portion 18 of the heating rod 16. A threaded fastener 33 is inserted into the bore 32 of the heating head 25 from the front face of the heating head 25 and is threadably inserted into a threaded bore in the outer end 24 of the heating rod 16 to detachably attach the heating head 25 to the outer portion 18 of the heating rod 16.

The bottom side 26 of the heating head 25 preferably generally lies in a plane generally parallel with the bottom face 13 of the base 11. Preferably, the upper sides 27,28 of the heating head 25 each are curved to have an outwardly facing concavity. The heating head 25 has an ideal height defined between the upper vertex 34 and the bottom side 26 of about ¾ inch. The heating head 25 has an ideal width defined between the upper sides 27,28 at the bottom side 26 between about ½ inch and 1 inch.

In use, each of the upper sides 27,28 of the heating head 25 is designed for melting a portion of a plastic fishing bait 1,2 abutting thereagainst to permit fusing of the melted portions of a pair of fishing baits 1,2 together to form a unique new fishing bait. First, the heating element 19 is energized to heat the heating rod 16 and the heating head 25 to a predetermined temperature. A first plastic fishing bait 1 is abutted against one of the upper sides 27 of the heating head 25 and a second plastic fishing bait 2 is abutted against another of the upper sides 28 of the heating head 25 until a portion of each plastic fishing bait 1,2 is melted by the heat of the heating head 25. The plastic fishing baits 1,2 are then slid upwards towards the upper vertex 34 and until so that the melted portions of the plastic fishing baits 1,2 are abutted together. The fishing baits are then moved away from the heating head 25 to let the melted portions fuse together as they cool so that a new plastic fishing bait is formed from the combination of the original plastic fishing baits.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool for fusing plastic fishing baits together, comprising:
   a base having top and bottom faces, and a perimeter side wall between said top and bottom faces of said base, said base having a center axis extending between said top and bottom faces of said base;
   a heating rod outwardly extending from said perimeter side wall of said base;
   said heating rod having an elongate inner portion extending into said base and an elongate outer portion outside of said base, said inner and outer portions of said heating rod each having a longitudinal axis;
   a coiled heating element for providing heat, said heating element being provided in said base and disposed around said inner portion of said heating rod;
   said heating rod having an outer end adjacent said outer portion of said heating rod; and
   a heating head being coupled to said outer end of said heating rod, said heating head being generally triangular in configuration and having a bottom side and a pair of upper sides converging together at an upper vertex.

2. The tool of claim 1, wherein said base is generally disk-shaped, said base having a diameter defined across said perimeter side wall of said base and a height defined between said top and bottom faces of said base, said diameter of said base being greater than said height of said base.

3. The tool of claim 2, wherein said diameter of said base is at least two times greater than said height of said base.

4. The device of claim 2, wherein said diameter of said base is about 5 inches and said height of said base is about 2 inches.

5. The tool of claim 1, wherein said longitudinal axes of said inner and outer portions of said heating rod are extended at an acute angle with respect to each other, wherein said acute angle is between about 30 degrees and about 60 degrees.

6. The tool of claim 5, wherein said acute angle is about 50 degrees.

7. The tool of claim 1, wherein said longitudinal axis of said outer portion of said heating rod extends radially outwards from said perimeter side wall of said base, said longitudinal axis of said outer portion of said heating rod generally lying in a plane generally perpendicular to said center axis of said base.

8. The tool of claim 1, further comprising a transformer being provided in said base, said heating element being electrically connected to said transformer.

9. The tool of claim 8, wherein said transformer has a flexible power cord outwardly extending from said perimeter side wall of said base at a diametric location on said perimeter side wall from said outer portion of said heating rod, said power cord being adapted for electrically connecting said transformer to an electrical power source.

10. The tool of claim 1, wherein said outer portion of said heating rod has an end region adjacent said outer end of said heating rod, wherein said heating head has generally triangular front and back faces and a bore extending therethrough between said front and back faces of said heating head, said end region of said outer portion being inserted into said bore of said heating head.

11. The tool of claim 10, wherein said end region of said outer portion has a generally rectangular transverse cross section generally perpendicular to said longitudinal axis of said outer portion, wherein said bore of said heating head has a generally rectangular transverse cross section, said rectangular transverse cross sections of said end region and said bore holding said heating head against rotation about said outer portion of said heating rod.

12. The tool of claim 10, wherein a threaded fastener is inserted into said bore of said heating head and being threadably inserted into said outer end of said heating rod to detachably attach said heating head to said outer portion of said heating rod.

13. A tool for fusing plastic fishing baits together, comprising:

a base being generally disk-shaped and having generally circular top and bottom faces, and a generally cylindrical perimeter side wall between said top and bottom faces of said base, said base having a center axis extending between said top and bottom faces of said base;

said top and bottom faces of said base being generally planar and generally lying in parallel planes to another generally perpendicular to said center axis of said base;

said bottom face of said base being adapted for resting on a resting surface, said bottom face of said base having a plurality of resiliently compressible resting pads;

said base having a diameter defined across said perimeter side wall of said base and a height defined between said top and bottom faces of said base;

said diameter of said base being at least two times greater than said height of said base;

a heating rod outwardly extending from said perimeter side wall of said base, said heating rod comprising a heat conductive material;

said heating rod having an elongate inner portion extending into said base and an elongate outer portion outside of said base, said inner and outer portions of said heating rod each having a longitudinal axis;

said inner and outer portions of said heating rod each having a generally circular transverse cross section generally perpendicular to said longitudinal axis of the respective portion of said heating rod;

said longitudinal axes of said inner and outer portions of said heating rod being extended at an acute angle with respect to each other, wherein said acute angle is between about 30 degrees and about 60 degrees;

said longitudinal axis of said outer portion of said heating rod extending radially outwards from said perimeter side wall of said base, said longitudinal axis of said outer portion of said heating rod generally lying in a plane generally perpendicular to said center axis of said base;

a coiled heating element for providing heat, said heating element being provided in said base and disposed around said inner portion of said heating rod such that heat from said heating element is conducted to said heating rod;

a transformer being provided in said base, said heating element being electrically connected to said transformer;

said transformer having a flexible power cord outwardly extending from said perimeter side wall of said base at a diametric location on said perimeter side wall from said outer portion of said heating rod, said power cord being adapted for electrically connecting said transformer to an electrical power source;

said heating rod having an outer end adjacent said outer portion of said heating rod;

a heating head being coupled to said outer end of said heating rod, said heating head being generally triangular in configuration and having a bottom side and a pair of upper sides converging together at an upper vertex;

said heating head comprising a heat conductive material such as a heat conductive metal material to permit conduction of heat from said heating rod to said heating head;

said outer portion of said heating rod having an end region adjacent said outer end of said heating rod;

said heating head having generally triangular front and back faces and a bore extending therethrough between said front and back faces of said heating head, said end region of said outer portion being inserted into said bore of said heating head;

said end region of said outer portion having a generally rectangular transverse cross section generally perpendicular to said longitudinal axis of said outer portion, said bore of said heating head having a generally rectangular transverse cross section, said rectangular transverse cross sections of said end region and said bore holding said heating head against rotation about said outer portion of said heating rod;

a threaded fastener being inserted into said bore of said heating head and being threadably inserted into said outer end of said heating rod to detachably attach said heating head to said outer portion of said heating rod;

said bottom side of said heating head generally lying in a plane generally parallel with said bottom face of said base; and said upper sides of said heating head each being curved to have an outwardly facing concavity.

* * * * *